(12) United States Patent
Yudenfriend et al.

(10) Patent No.: US 10,922,009 B2
(45) Date of Patent: Feb. 16, 2021

(54) MIRRORING WRITE OPERATIONS ACROSS DATA STORAGE DEVICES

(71) Applicant: International Business Machines Corporation, Armonk, NY (US)

(72) Inventors: Harry M. Yudenfriend, Poughkeepsie, NY (US); Peter Grimm Sutton, Lagrangeville, NY (US); Scott B. Compton, Hyde Park, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/505,453

(22) Filed: Jul. 8, 2019

(65) Prior Publication Data

US 2021/0011626 A1 Jan. 14, 2021

(51) Int. Cl.
*G06F 13/00* (2006.01)
*G06F 3/06* (2006.01)
*G06F 16/907* (2019.01)

(52) U.S. Cl.
CPC .............. *G06F 3/065* (2013.01); *G06F 3/067* (2013.01); *G06F 3/0613* (2013.01); *G06F 3/0619* (2013.01); *G06F 16/907* (2019.01)

(58) Field of Classification Search
CPC ........ G06F 3/065; G06F 3/067; G06F 3/0613; G06F 16/907; G06F 3/0619
See application file for complete search history.

(56) References Cited

U.S. PATENT DOCUMENTS

| 6,941,396 | B1 * | 9/2005 | Thorpe | G06F 3/0613 707/999.202 |
| 7,472,221 | B1 | 12/2008 | Cartmell et al. | |
| 9,436,407 | B1 * | 9/2016 | Fan | G06F 3/065 |

(Continued)

FOREIGN PATENT DOCUMENTS

| CN | 105373449 A | 3/2016 |
| WO | 2015164049 A1 | 10/2015 |

OTHER PUBLICATIONS

Yudenfriend, H., "IBM z13 and DS8870 I/O Innovations for z Systems," IBM, Share Session 16896, Mar. 3, 2015, pp. 1-80.

(Continued)

*Primary Examiner* — Jing-Yih Shyu
(74) *Attorney, Agent, or Firm* — Zilka-Kotab, P.C.

(57) ABSTRACT

A computer-implemented method, according to one approach, includes: receiving a first request to perform a write operation from a host, and performing the write operation. Metadata corresponding to the first request is sent to the secondary data storage device, and metadata corresponding to a second request to perform the write operation is received from the secondary data storage device, where the second request was received at the secondary data storage device from the host. The metadata corresponding to the first and second requests is used to determine whether the write operation has been mirrored across the primary and secondary data storage devices. In response to determining that the write operation has been mirrored across the primary and secondary data storage devices, a response is sent to the secondary data storage device which indicates that the write operation has been reconciled across the primary and secondary data storage devices.

25 Claims, 6 Drawing Sheets

(56) References Cited

U.S. PATENT DOCUMENTS

| | | | |
|---|---|---|---|
| 9,678,674 B2 | 6/2017 | Craddock et al. | |
| 9,710,171 B2 | 7/2017 | Craddock et al. | |
| 9,940,379 B2* | 4/2018 | Compton | G06F 16/275 |
| 10,068,001 B2 | 9/2018 | Craddock et al. | |
| 10,120,822 B2 | 11/2018 | Craddock et al. | |
| 10,133,691 B2 | 11/2018 | Brewer et al. | |
| 2007/0016754 A1* | 1/2007 | Testardi | G06F 3/0635 |
| | | | 711/206 |
| 2013/0246704 A1* | 9/2013 | Kotzur | G06F 3/0638 |
| | | | 711/114 |
| 2014/0181366 A1* | 6/2014 | Venkatesh | G06F 12/08 |
| | | | 711/103 |
| 2015/0135003 A1 | 5/2015 | Cota-Robles et al. | |
| 2015/0261633 A1* | 9/2015 | Usgaonkar | G06F 11/2097 |
| | | | 714/6.3 |
| 2019/0073265 A1* | 3/2019 | Brennan | G06F 3/061 |

OTHER PUBLICATIONS

Clayton, N., "IBM Z and DS8000 Performance Topics," GSE, UK Conference, Session DJ, Aug. 11, 2017, 31 pages.

Biondo et al., "IBM DS8880 and IBM Z Synergy," IBM Redbooks, Mar. 2018, pp. 1-112.

Anonymous, "Write Trickling to Extend the Lifetime of the Bidirectional Data Bus Architecture for Memory Systems," ip.com Prior Art Database, Technical Disclosure No. IPCOM000127758D, Sep. 13, 2005, 3 pages.

Anonymous, "Loop versioning to reduce garbage collection write barrier overhead," ip.com Prior Art Database, Technical Disclosure No. IPCOM000227950D, May 30, 2013, 6 pages.

Anonymous, "Write Amplification improvement through Data localization in 3D stacked NAND-Flash," ip.com Prior Art Database, Technical Disclosure No. IPCOM000255249D, Sep. 12, 2018, 7 pages.

International Search Report and Written Opinion from PCT Application No. PCT/IB2020/056004, dated Oct. 10, 2020.

\* cited by examiner

MIRRORING WRITE OPERATIONS ACROSS DATA STORAGE DEVICES

BACKGROUND

The present invention relates to data storage systems, and more specifically, this invention relates to mirroring write operations across more than one data storage device.

In conventional data replication systems, users issue input/output (I/O) requests to a single storage location, such as a primary storage location, which ultimately modifies data according to the I/O requests received. In an effort to increase data retention, conventional data replication systems sometimes also implement a second storage location which is used to maintain a secondary (e.g., backup) copy of the data stored at the primary storage location. This redundant copy of the data at the recovery storage location is particularly useful in situations where the primary storage location becomes unavailable and/or experiences data loss. In some situations, the recovery storage location is even able to assume operational responsibility in response to determining that the primary storage location is unable to.

In such conventional systems, the primary storage location forwards the I/O requests received from the users to the second storage location for implementation. While it does improve data retention, this data storage scheme experiences a notable increase in processing overhead as a result of satisfying the additional requests. For instance, I/O requests are transferred between each of the locations, introducing performance delays which increase with the number of locations implemented. Moreover, a failure event experienced at any of the locations and/or the connections extending therebetween disrupts the transfer of I/O requests therebetween and results in more than one copy of data to become out-of-synch. In turn, this must be remedied before the system is operational, thereby introducing additional performance delays.

SUMMARY

A computer-implemented method, according to one approach, is for mirroring write operations across primary and secondary data storage devices. The computer-implemented method includes: receiving a first request to perform a write operation from a host, and performing the write operation. Metadata corresponding to the first request is sent to the secondary data storage device, and metadata corresponding to a second request to perform the write operation is also received from the secondary data storage device. It follows that the second request was received at the secondary data storage device from the host. The metadata corresponding to the first and second requests is used to determine whether the write operation has been mirrored across the primary and secondary data storage devices. In response to determining that the write operation has been mirrored across the primary and secondary data storage devices, a response is sent to the secondary data storage device which indicates that the write operation has been reconciled across the primary and secondary data storage devices.

As a result, performance times are reduced by allowing the host to communicate with the primary and secondary data storage devices in parallel. For instance, various ones of the approaches described herein are able to achieve a reduction of overhead. Similarly, the primary and secondary data storage devices are able to operate in parallel as well as perform synchronization procedures therebetween without relying on input from the host. This allows for the data storage devices to assume responsibility for ensuring that the data is propagated according to the intended data storage schemes. This reduces network traffic and data retention is also improved as a result of actively ensuring that data is mirrored across multiple data storage devices. Accordingly, it is preferred that the various processes included in these approaches are applied to all write operations (e.g., all application writes) received from the host.

In some approaches, the computer-implemented method also includes: receiving a read request, and determining whether data specified in the read request has been reconciled across the primary and secondary data storage devices. In response to determining that the data specified in the read request has not been reconciled across the primary and secondary data storage devices, performance of the read request is delayed. However, in response to determining that the data specified in the read request has been reconciled across the primary and secondary data storage devices, the read operation performed.

As a result, operational efficiency of the overarching system is further improved by essentially eliminating situations where a read operation is attempted, only to find that the data intended to be read is not yet stored in memory, has not yet been updated according to a modify write operation, etc. Moreover, these operations may be implemented without causing any disruption to performance. This is particularly desirable as the delay reductions and data retention achieved by the approaches described above may be combined with the improvements to read performance achieved by the present approach.

A computer program product, according to another approach, is for mirroring write operations across primary and secondary data storage devices. The computer program product includes a computer readable storage medium having program instructions embodied therewith. Moreover, the program instructions are readable and/or executable by a processor to cause the processor to: perform the foregoing method.

A primary data storage device, according to yet another approach, includes: a processor, and logic integrated with the processor, executable by the processor, or integrated with and executable by the processor. The logic is configured to: perform the foregoing method.

A computer-implemented method, according to another approach, is for mirroring write operations across primary and secondary data storage devices. The computer-implemented method includes: receiving a first request to perform a write operation from a host, and performing the write operation. Metadata corresponding to the first request is sent to the primary data storage device. Metadata corresponding to a second request to perform the write operation is also received from the primary data storage device, where the second request was received at the primary data storage device from the host. The metadata corresponding to the first and second requests is used to determine whether the write operation has been mirrored across the primary and secondary data storage devices. Moreover, in response to determining that the write operation has been mirrored across the primary and secondary data storage devices, a response is sent to the primary data storage device which indicates that the write operation has been reconciled across the primary and secondary data storage devices.

A computer-implemented method, according to yet another approach, is for mirroring write operations across primary and secondary data storage devices. Here, the computer-implemented method includes: sending a first request to perform a write operation to a primary data storage device, and sending a second request to perform the write operation to a secondary data storage device. A first response is received from the primary data storage device which indicates that the write operation has been performed. Moreover, a first response is received from the secondary data storage device which indicates that the write operation has been performed.

As noted above, performance times are reduced by allowing the host to communicate with the primary and secondary data storage devices in parallel. For instance, various ones of the approaches described herein are able to achieve a reduction of overhead. Similarly, the primary and secondary data storage devices are able to operate in parallel as well as perform synchronization procedures therebetween without relying on input from the host. This allows for the data storage devices to assume responsibility for ensuring that the data is propagated according to the intended data storage schemes. This reduces network traffic and data retention is also improved as a result of actively ensuring that data is mirrored across multiple data storage devices. Accordingly, it is preferred that the various processes included in these approaches are applied to all write operations (e.g., all application writes) received from the host.

Other aspects and approaches of the present invention will become apparent from the following detailed description, which, when taken in conjunction with the drawings, illustrate by way of example the principles of the invention.

DETAILED DESCRIPTION

Figure 1:
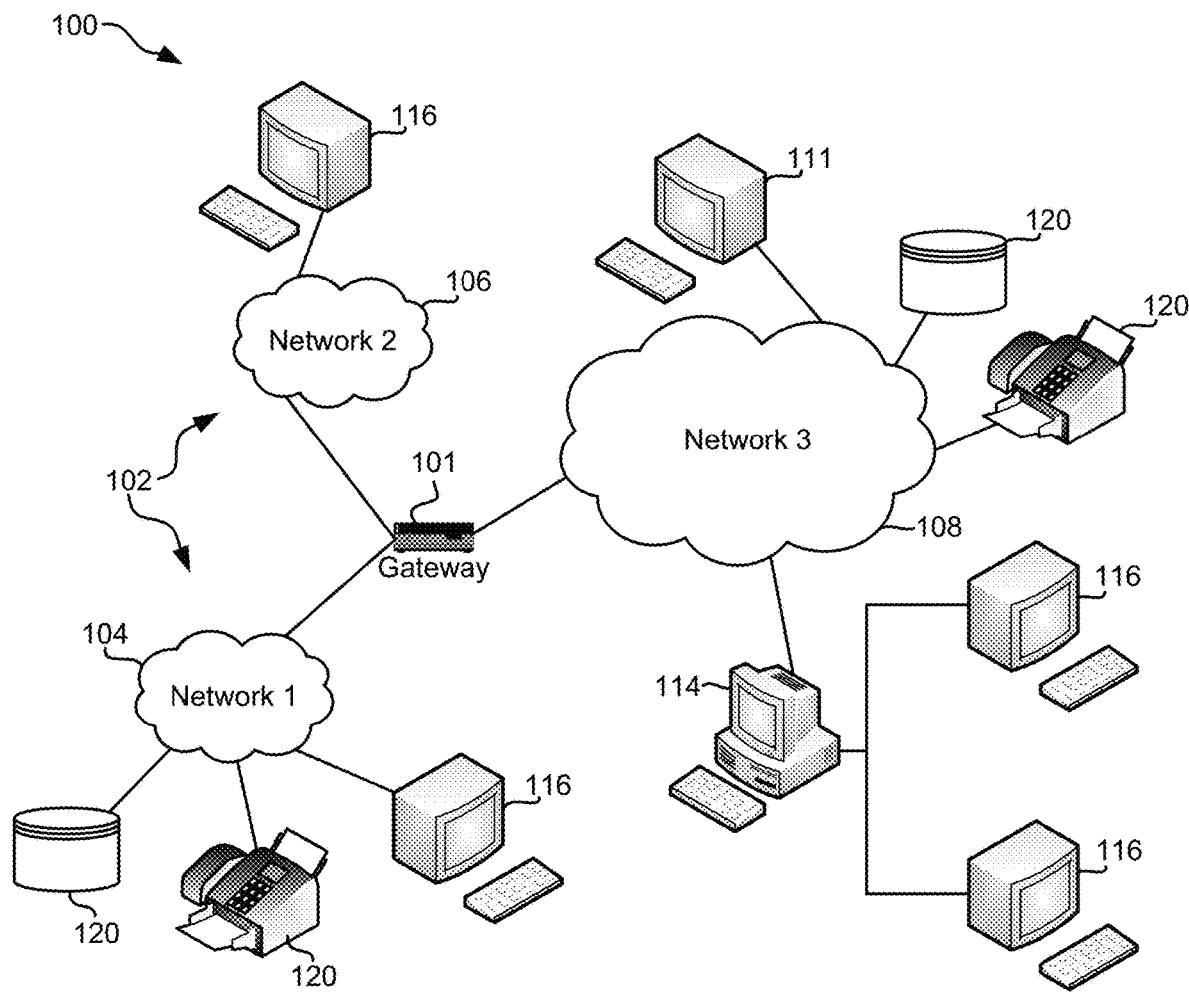
FIG. 1 is a network architecture, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for mirroring write operations across more than one data storage device. It should be noted that "mirroring" write operations across storage devices refers to the process of reconciling differences in copies of the same data at two different storage locations, e.g., as would be appreciated by one skilled in the art after reading the present description. Accordingly, various ones of the approaches included herein are desirably able to reduce performance times by allowing a host to communicate with the multiple data storage devices in parallel. Similarly, the data storage devices are able to operate in parallel as well as perform data synchronization procedures therebetween without relying on input from the host. This allows for the control units in each of the data storage devices to assume responsibility for ensuring that the data is propagated according to the intended data storage schemes, thereby achieving significant improvements in comparison to conventional procedures, e.g., as will be described in further detail below.

In one general approach, a computer-implemented method is used to mirror write operations across primary and secondary data storage devices. The computer-implemented method includes: receiving a first request to perform a write operation from a host, and performing the write operation. Metadata corresponding to the first request is sent to the secondary data storage device, and metadata corresponding to a second request to perform the write operation is also received from the secondary data storage device. It follows that the second request was received at the secondary data storage device from the host. The metadata corresponding to the first and second requests is used to determine whether the write operation has been mirrored across the primary and secondary data storage devices. In response to determining that the write operation has been mirrored across the primary and secondary data storage devices, a response is sent to the secondary data storage device which indicates that the write operation has been reconciled across the primary and secondary data storage devices.

In another general approach, a computer program product is used to mirror write operations across primary and secondary data storage devices. The computer program product includes a computer readable storage medium having program instructions embodied therewith. Moreover, the program instructions are readable and/or executable by a processor to cause the processor to: perform the foregoing method.

In yet another general approach, a primary data storage device includes: a processor, and logic integrated with the processor, executable by the processor, or integrated with and executable by the processor. The logic is configured to: perform the foregoing method.

In another general approach, a computer-implemented method is used to mirror write operations across primary and secondary data storage devices. The computer-implemented method includes: receiving a first request to perform a write operation from a host, and performing the write operation. Metadata corresponding to the first request is sent to the primary data storage device. Metadata corresponding to a second request to perform the write operation is also received from the primary data storage device, where the second request was received at the primary data storage device from the host. The metadata corresponding to the first and second requests is used to determine whether the write operation has been mirrored across the primary and secondary data storage devices. Moreover, in response to determining that the write operation has been mirrored across the primary and secondary data storage devices, a response is sent to the primary data storage device which indicates that the write operation has been reconciled across the primary and secondary data storage devices.

In still another general approach, a computer-implemented method is used to mirror write operations across primary and secondary data storage devices. Here, the computer-implemented method includes: sending a first request to perform a write operation to a primary data storage device, and sending a second request to perform the write operation to a secondary data storage device. A first response is received from the primary data storage device which indicates that the write operation has been performed. Moreover, a first response is received from the secondary data storage device which indicates that the write operation has been performed.

FIG. 1 illustrates an architecture 100, in accordance with one approach. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Depending on the approach, such user devices 116 may include a mainframe (e.g., as described herein), desktop computer, lap-top computer, hand-held computer, printer or any other type of logic. It should be noted that a user device 111 may also be directly coupled to any of the networks, in one approach.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some approaches.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
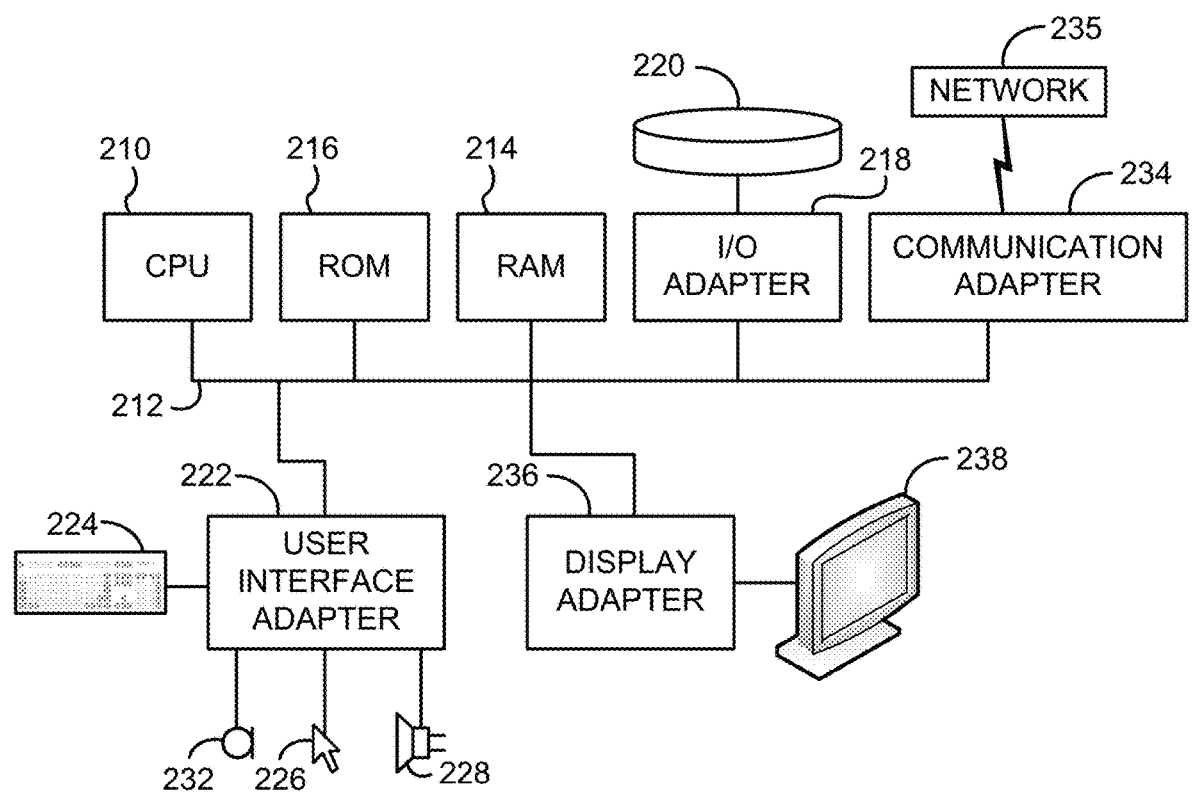
FIG. 2 is a representative hardware environment that may be associated with the servers and/or clients of FIG. 1, in accordance with one approach.

FIG. 2 shows a representative hardware environment associated with a user device 116 and/or server 114 of FIG. 1, in accordance with one approach. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238. According to an exemplary approach, which is in no way intended to limit the invention, the disk storage units 220 may be incorporated in a DS8000 disk storage offered by IBM having a sales office at 1 New Orchard Rd., Armonk, N.Y. 10504.

The workstation may have resident thereon an operating system such as the Microsoft Windows® Operating System (OS), a MAC OS, a UNIX OS, etc. It will be appreciated that a preferred approach may also be implemented on platforms and operating systems other than those mentioned. A preferred approach may be written using assembly language, C, and/or C++ language, or other programming languages, along with an object oriented programming methodology. Object oriented programming (OOP), which has become increasingly used to develop complex applications, may be used.

Figure 3:
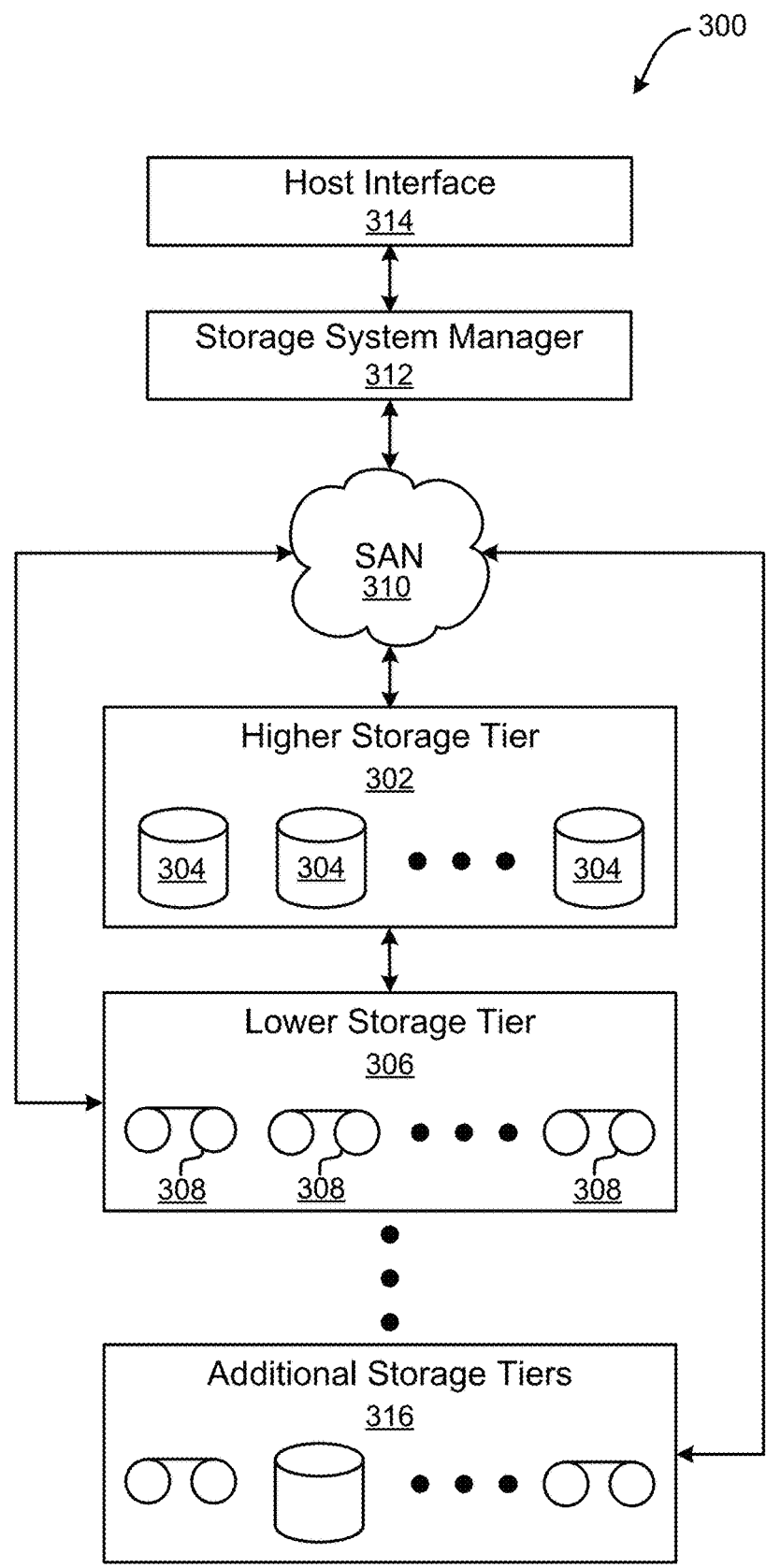
FIG. 3 is a tiered data storage system in accordance with one approach.

Now referring to FIG. 3, a storage system 300 is shown according to one approach. Note that some of the elements shown in FIG. 3 may be implemented as hardware and/or software, according to various approaches. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the approaches presented herein.

According to some approaches, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various approaches.

As previously mentioned, multiple storage devices are implemented in an effort to maintain one or more redundant copies of data and increase data retention. These redundant copies of the data are particularly useful in situations where the primary storage location becomes unavailable and/or experiences data loss. In some situations, recovery storage locations are able to assume operational responsibility in response to determining that the primary storage location is unable to.

However, conventional data replication systems do experience some performance setbacks in terms of implementing user I/O requests across multiple storage devices. In such conventional systems, the primary storage location forwards the I/O requests received from the users to the second storage location for implementation. While it does tend to improve data retention, this data storage scheme experiences a notable increase in processing overhead as a result of satisfying the additional requests. For instance, I/O requests are transferred between each of the locations, introducing performance delays which increase as the number of storage locations implemented increase.

Moreover, a failure event experienced at any of the locations and/or the connections extending therebetween disrupts the transfer of I/O requests therebetween and results in more than one copy of data to become out-of-synch. In turn, this must be remedied before the system returns to being operational, thereby introducing additional performance delays. However, the manner in which the data becomes out-of-synch and the area that it extends to varies depending on when and where the failure event is experienced. This increases the complexity of the recovery process. For example, all I/O requests which are inflight when a failure event occurs are repeated at all locations once the failure has been remedied.

In sharp contrast to the aforementioned shortcomings experienced by conventional data replication systems, various ones of the approaches included herein are able to efficiently maintain more than one copy of data across more than one data storage location. Accordingly, I/O requests received from a user (e.g., host) are implemented across the data storage locations without experiencing the performance delays which have plagued conventional systems, also without compromising data retention, e.g., as will be described in further detail below.

Figure 4:
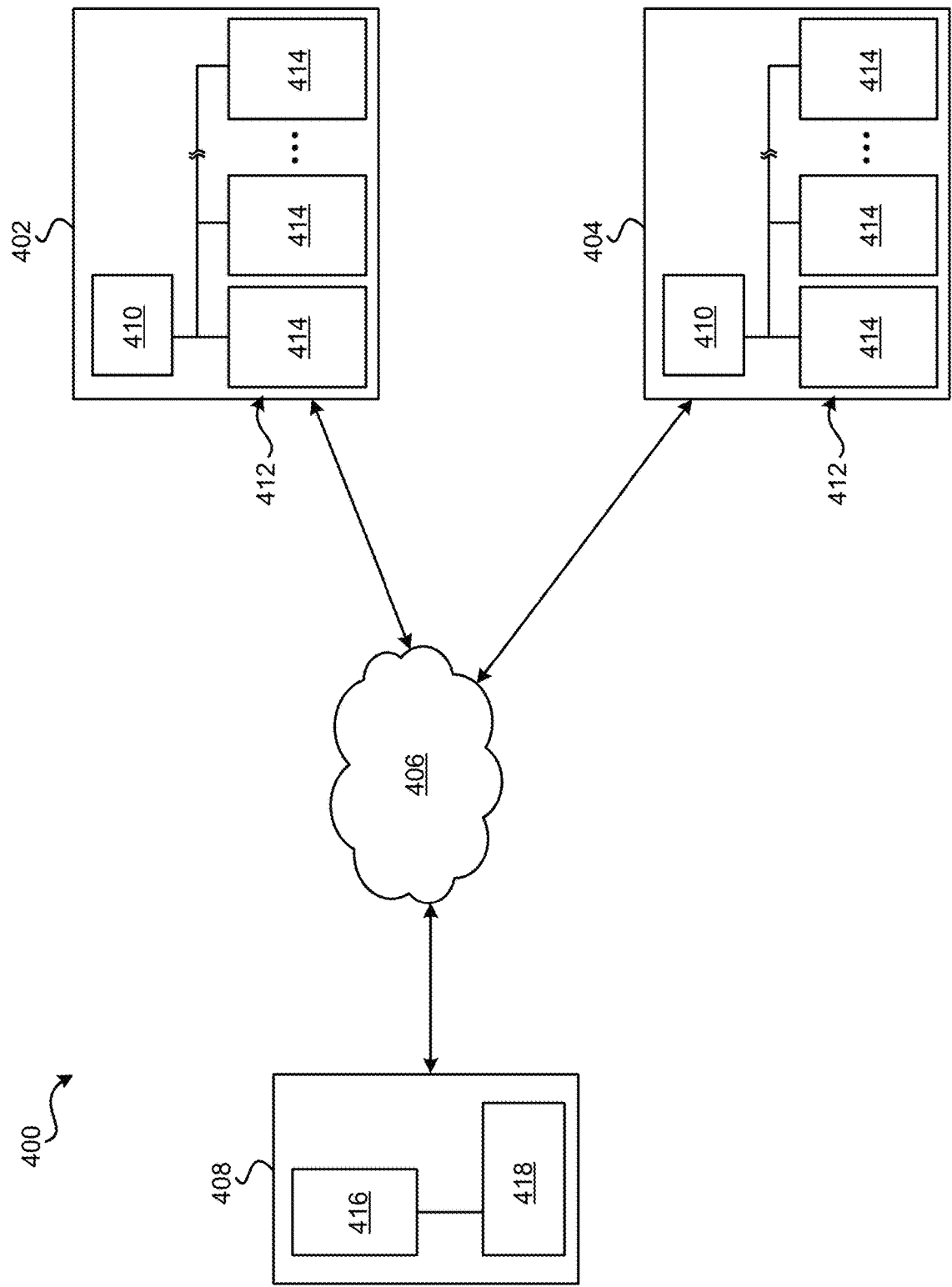
FIG. 4 is a partial representational view of a distributed data storage system in accordance with one approach.

Looking to FIG. 4, a distributed data storage system 400 is illustrated in accordance with one approach. As an option, the present distributed data storage system 400 may be implemented in conjunction with features from any other approach listed herein, such as those described with reference to the other FIGS. However, such distributed data storage system 400 and others presented herein may be used in various applications and/or in permutations which may or may not be specifically described in the illustrative approaches listed herein. Further, the distributed data storage system 400 presented herein may be used in any desired environment. Thus FIG. 4 (and the other FIGS.) may be deemed to include any possible permutation.

As show, the distributed data storage system 400 includes a primary data storage device 402 and a secondary data storage device 404, both of which are connected to a network 406. A host 408 location is also connected to the network 406, which may be any type of network, e.g., depending on the desired approach. For instance, in some approaches the network 406 is a WAN, e.g., such as the Internet. However, an illustrative list of other network types which network 406 may implement includes, but is not limited to, a LAN, a PSTN, a SAN, an internal telephone network, etc. Accordingly, the primary data storage device 402, the secondary data storage device 404, and the host 408 are able to communicate with each other regardless of the amount of separation which exists therebetween, e.g., despite being positioned at different geographical locations.

Although each of the data storage devices 402, 404 and the host 408 may communicate with each other over the same single network 406 in some approaches, it should be noted that more than one network may be implemented between any two or more of the data storage devices 402, 404 and the host 408. For example, the host 408 may communicate with each of the data storage devices 402, 404 over network 406 while the primary and secondary data storage devices 402, 404 communicate with each other over a separate network and/or a physical electrical connection which may extend therebetween. Accordingly, network 406 as illustrated in FIG. 4 is in no way intended to be limiting, and may actually include a number of different networks, e.g., as depicted in FIG. 1.

Each of the primary and secondary data storage devices 402, 404 include a controller 410 (e.g., processor) which is coupled to a memory array 412. Depending on the approach, the memory array 412 included in each of the primary and secondary data storage devices 402, 404 may consist of different types of storage components 414. For instance, the memory array 412 in the primary data storage device 402 includes higher performance storage components than those included in the secondary data storage device 404 in some approaches. It should be noted that in terms of the present description, "higher performance" may be measured with respect to achievable throughput, performance delays, reliability factors, etc. In other words, the primary data storage device 402 includes storage components which have a higher achievable throughput, lower performance delays, higher reliability factors, etc. in comparison to those of the storage components included in the secondary data storage device 404.

The host 408 location serves as an interface between users and the distributed data storage system 400 in some approaches. Thus, the host 408 receives and processes I/O requests originated by one or more users. It follows that the host 408 includes a controller 416 (e.g., processor) with a high enough achievable throughput to process the data received. The controller 416 is further coupled to memory 418 which may be used to at least temporarily store information (e.g., such as data, I/O requests, metadata, etc.) in a queue. However, in some approaches the host 408 may actually be a z14 mainframe offered by IBM having a sales office at 1 New Orchard Rd., Armonk, N.Y. 10504.

Once again, various ones of the approaches included herein are able to efficiently maintain more than one copy of data across more than one data storage location. Accordingly, the distributed data storage system 400 and the components included therein are desirably able to mirror I/O operations across primary and secondary data storage devices in an efficient and effective manner. Each of the primary and secondary data storage devices maintain a copy of the same data and assume the responsibility of keeping the copies in synch, even in situations where failure events are experienced during an update (e.g., write operation) being performed thereto, e.g., as will be described in further detail below.

Figure 5A:
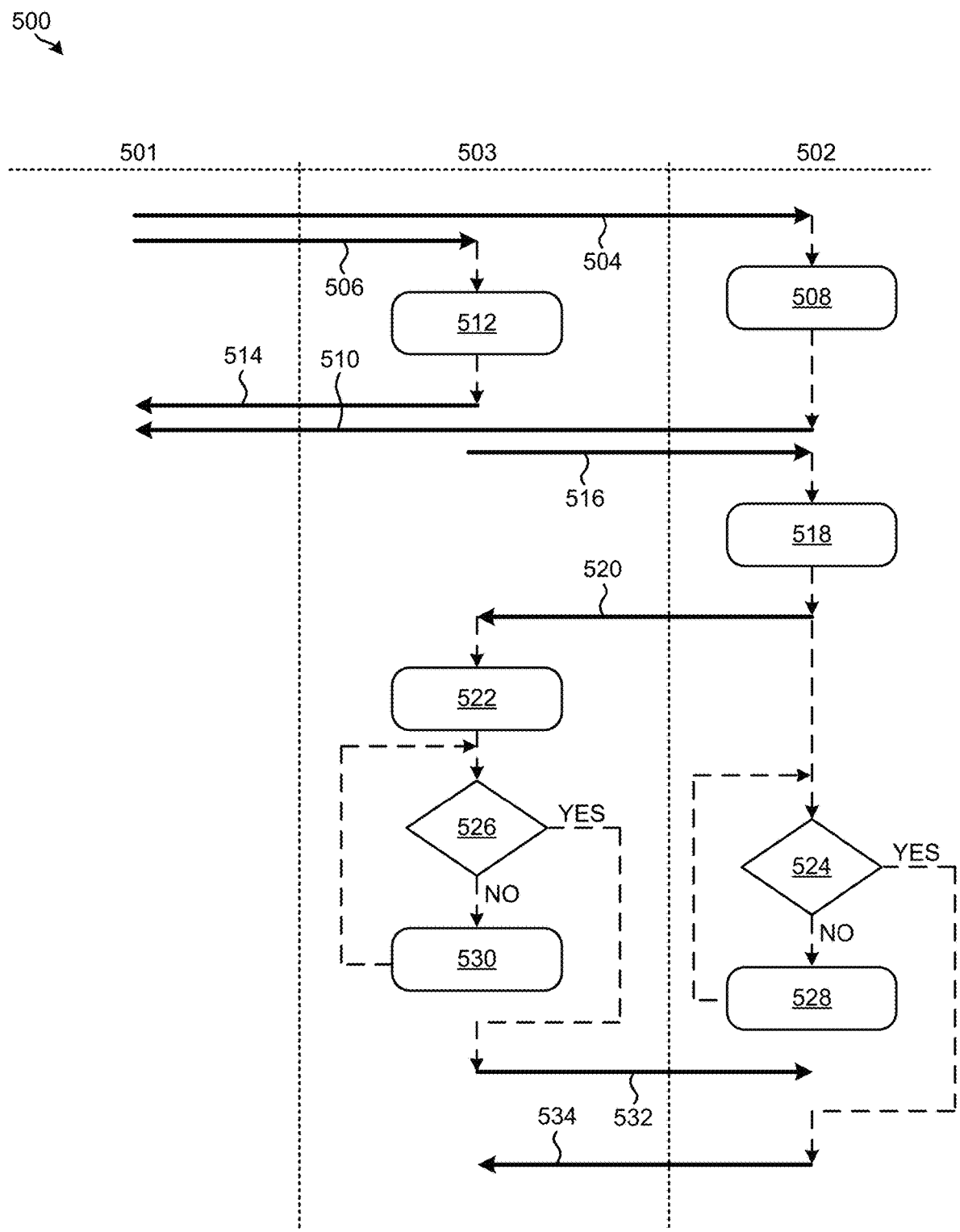
FIG. 5A is a flowchart of a method in accordance with one approach.

For instance, looking now to FIG. 5A, a flowchart of a computer-implemented method 500 for mirroring write operations across more than one data storage device is shown according to one approach. The method 500 may be performed in accordance with the present invention in any of the environments depicted in FIGS. 1-4, among others, in various approaches. Of course, more or less operations than those specifically described in FIG. 5A may be included in method 500, as would be understood by one of skill in the art upon reading the present descriptions.

Each of the steps of the method 500 may be performed by any suitable component of the operating environment. For example, each of the nodes 501, 502, 503 shown in the flowchart of method 500 may correspond to one or more processors positioned at a different location in a multi-tiered data storage system. Moreover, each of the one or more processors are preferably configured to communicate with each other.

In various approaches, the method 500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

As mentioned above, FIG. 5A includes different nodes 501, 502, 503, each of which represent one or more processors, controllers, computer, etc., positioned at a different location in a multi-tiered data storage system. For instance, node 501 may include one or more processors which are electrically coupled to a host location of a distributed data storage system (e.g., see host 408 of FIG. 4 above). Node 502 may include one or more processors which are electrically coupled to a primary data storage device of a distributed data storage system (e.g., see 402 of FIG. 4 above). Furthermore, node 503 may include one or more processors which are electrically coupled to a secondary data storage device of a distributed data storage system (e.g., see 404 of FIG. 4 above). Accordingly, commands, data, requests, etc. may be sent between each of the nodes 501, 502, 503 depending on the approach. Moreover, it should be noted that the various processes included in method 500 are in no way intended to be limiting, e.g., as would be appreciated by one skilled in the art after reading the present description. For instance, data sent from node 502 to node 503 may be prefaced by a request sent from node 503 to node 502 in some approaches.

As shown, operation 504 of method 500 is performed by the one or more processors at node 501 and includes sending a first request to perform a write operation to node 502. Similarly, a second request to perform the same write operation is sent to node 503 in operation 506. It should be noted that the requests sent in operations 504 and 506 correspond to the same write operation. In other words, the same write operation is sent to node 502 as well as node 503. In some approaches the first and second requests to perform the write operation are sent in parallel, while in other approaches the first and second requests to perform the write operation are sent sequentially, separately, etc., depending on the desired approach.

Each of the requests to perform the write operation also include metadata which is received along with the requests themselves. For instance, the first and second requests sent in operations 504 and 506 respectively, correspond to the same the write operation and therefore are related to each other. This relationship between the first and second requests is reflected in the metadata received along with the requests, and may be used to identify how the two requests correspond to each other.

Moreover, the first and second requests preferably lead to the same write operation being performed at the primary and secondary data storage devices, which may be considered as a form of mirroring e.g., software mirroring. It follows that the term "mirroring" as used herein is intended to refer to the process of selectively performing the same write operation at more than one different data storage device. Determinations may further be made (e.g., by a control unit) as to whether a write operation has been "reconciled" by querying the data storage devices to which the write operation was sent. In response to successfully mirroring the write operation, the data storage devices may respond by indicating that the write operation has in fact been "reconciled", e.g., as will be described in further detail below.

Looking to node 502, in response to receiving the first request to perform the write operation from the host at node 501, operation 508 includes actually performing the write operation. The write operation may be performed using any data recording processes which would be apparent to one skilled in the art after reading the present description. Moreover, operation 510 includes sending a response to the host at node 501 which indicates that that the write operation has successfully been performed at the primary data storage device.

Looking now to node 503, in response to receiving the second request to perform the write operation from node 501, operation 512 includes actually performing the write operation at the secondary data storage device. Again, the write operation may be performed using any data recording processes which would be apparent to one skilled in the art after reading the present description. Moreover, operation 514 includes sending another response to the host at node 501 which indicates that that the write operation has successfully been performed at the secondary data storage device.

From the host's perspective at node 501, the write operation is determined as having been effectively mirrored (e.g., in the context of software mirroring) in response to receiving successful completion responses (e.g., notifications). Accordingly, from the host's perspective at node 501, a determination is made that the write operation has been successfully completed in response to receiving the responses in operations 510, 514. However, looking to the primary and secondary storage devices at nodes 502, 503 respectively, a write operation is not considered as having been completed until each device receives an indication from the other device that the write operation has been successfully completed, as will be described in further detail below (e.g., see operations 532, 534).

The responses sent to the host in operations 510 and 514 may be the same, similar, or different from each other. In other words, the type of responses, amount of information included in each of the responses, type of information included in each of the responses, etc. sent in operations 510 and 514 may be the same, similar, or different from each other. According to an illustrative approach which is in no way intended to limit the invention, the responses sent to the host in operations 510 and 514 are channel end/device end completion statuses.

Proceeding to operation 516, a copy of the metadata corresponding to the second request to perform the write operation is sent from node 503 to node 502. The metadata received from node 503 is thereby stored in memory at node 502. See operation 518. Similarly, a copy of the metadata corresponding to the first request to perform the write operation is sent from node 502 to node 503. See operation 520. Looking further to operation 522, the metadata received at node 503 is further stored in memory. It follows that each of the nodes 502, 503 include metadata which corresponds to both requests issued by the host at node 501. At least some of the metadata sent between the primary and secondary data storage devices is preferably of the same type, thereby allowing for meaningful comparisons to be made. Moreover, the metadata corresponding to the first and/or second requests to perform the write operation may include a timestamp (e.g., "time-of-day" information), hash values or tables which uniquely identify the content of the requests, storage location identification (e.g., in a ccccCCChr format), etc., depending on the desired approach.

The process of storing the metadata in memory at each of the primary and secondary data storage devices may also vary depending on the approach. For instance, in some approaches metadata is aggregated in memory over time. In other approaches the consumption of data storage capacity may be more of a priority, whereby only a certain amount of metadata may be stored in memory. In still other approaches, metadata corresponding to data which has been overwritten, deleted, modified, etc. as a result of performing a write operation is overwritten by the metadata which corresponds to the write operation performed. In other words, metadata corresponding to a previous write operation request is overwritten by metadata corresponding to a subsequent write operation request which correlates to a same record (e.g., file) as the previous request. It follows that any I/O requests received that correspond to metadata which has since been overwritten may confidently be ignored.

With continued reference to FIG. 5A, the combination of metadata which corresponds to the first and second requests to perform the write operation may thereby be evaluated by each of the respective nodes 502, 503 to determine whether the write operation has been successfully mirrored across the primary and secondary data storage devices. For instance, decision 524 is performed by node 502 and includes determining whether the write operation has been mirrored across the primary and secondary data storage devices. In other words, decision 524 includes determining whether any differences between the copies of data at the primary and secondary data storage devices have been reconciled. This determination is made using the metadata corresponding to the first and second requests to perform the write operation in preferred approaches. For example, hash values corresponding to the first and second requests is used in some approaches to identify what data has been written to memory. Moreover, metadata identifying where the data in the write operation is actually stored in memory is compared between the primary and secondary data storage devices in some approaches.

Similarly, decision 526 is performed by node 503 and includes determining whether the write operation has been successfully mirrored across the primary and secondary data storage devices. As mentioned above, this determination is preferably made using the metadata corresponding to the first and second requests to perform the write operation, e.g., using any of the approaches described herein.

It follows that decisions 524 and 526 involve making the same or similar determinations in terms of whether the data at both the primary and secondary data storage devices match as a result of performing the write operation corresponding to the requests originally received above from the host. In other words, the primary and secondary data storage devices synchronize (e.g., cross-verify) with each other to determine whether the data has been reconciled at both locations, thereby ensuring that the data is the same at both locations.

It should also be noted that although select ones of the processes illustrated in FIG. 5A appear to be performed in a specific order or sequence, this is in no way intended to be limiting. For instance, looking to operations 504 and 506, the first and second requests to perform the same write operation may be sent together (e.g., in parallel), asynchronously, sequentially, etc. Similarly, the write operation may be performed asynchronously at each of the primary and secondary data storage devices, e.g., depending on when the respective request to perform the write operation was received.

As noted above, determining whether the write operation has been mirrored across the primary and secondary data storage devices involves utilizing metadata which corresponds to the request sent to each of the devices. Performing decisions 524 and/or 526 thereby hinges on whether the metadata has actually been received by the respective data storage device in some approaches. However, in other approaches decisions 524 and/or 526 may be performed in response to waiting a predetermined amount of time after the respective request to perform the write operation was received, receiving a command from the host, etc.

In response to determining that the write operation has not yet been mirrored across the primary and secondary data storage devices, method 500 proceeds from decision 524 to operation 528. There, operation 528 includes waiting a predetermine amount of time before returning to decision 524 to determine if the differences in the data have been reconciled. Similarly, method 500 proceeds from decision 526 to operation 530 in response to determining that the write operation has not yet been mirrored across the primary and secondary data storage devices. There, operation 530 also includes waiting a predetermine amount of time before returning to decision 526 to determine if the differences in the data have been reconciled.

A failure to properly reconcile the copies of data at the primary and secondary data storage devices may result from a number of different circumstances. For instance, the connection between the host and one or more of the data storage devices may be compromised, thereby preventing the request to perform the write operation from ever being received at one or more of the data storage devices. In such situations method 500 may simply continue to wait for the compromised connection to be repaired. In other instances, the connection between the primary and secondary data storage devices themselves may be compromised, thereby preventing metadata from being transferred therebetween. In these situations, method 500 may continue to wait for the connection that extends between the data storage devices themselves to be repaired. In still other approaches, the host, the primary data storage device and/or the secondary data storage device may be offline, e.g., in response to experiencing a failure event. Accordingly, method 500 may continue to wait for one or more of the physical components themselves to be restarted and/or repaired. In response to returning to normal operation, write operations implemented on a functioning device while the failed device was offline may be specifically identified (e.g., in a delta update document) and implemented in an incremental resync type procedure.

In situations where operation 528 and/or 530 are repeated a predetermined amount of times, method 500 may take additional action(s). For instance, in response to determining that the data at each of the primary and secondary data storage devices remains out-of-synch after a predetermine number of reattempts, the mirroring relationship between the primary and secondary data storage devices may be terminated, e.g., at least temporarily, such that a data recovery protocol may be entered. The data recovery protocol that is implemented depends on the reason that the write operation was not successfully mirrored across the data storage devices. For instance, the data recovery protocol may involve inspecting and repairing the connection between the host and the data storage devices. In other approaches, a reattempt may be made to transfer metadata corresponding to the write operation requests between the primary and secondary data storage devices. Yet, in other approaches the host may be prompted to reissue the write operation requests altogether.

In still other approaches, the recovery protocol may ensure that the data corresponding to the write operation is successfully mirrored across the primary and secondary data storage devices, whereby method 500 may end. However, it should be noted that although method 500 may effectively end upon performing a given operation, any one or more of the processes included in method 500 may be repeated in order to mirror additional write operations across the data storage devices. In other words, any one or more of the processes included in method 500 may be repeated for subsequently received write operations.

Returning to decision 526, method proceeds to operation 532 in response to determining that the write operation has been mirrored across the primary and secondary data storage devices. There, operation 532 includes sending a response to the primary data storage device at node 502 which indicates that the secondary data storage device has determined the write operation has been successfully reconciled across the primary and secondary data storage devices. In other words, a write completion acknowledgement is sent from the secondary data storage device to the primary data storage device which indicates the data has been reconciled across the data storage devices according to the secondary data storage device. Accordingly, the primary data storage device is informed that the data stored in each of the primary and secondary data storage devices has been updated in accordance with the write operation. Similarly, method 500 proceeds to operation 534 from decision 524 in response to determining that the write operation has been mirrored across the primary and secondary data storage devices. There, operation 534 includes sending another response to the secondary data storage device at node 503 which indicates that the primary data storage device has determined the write operation has been successfully reconciled across the primary and secondary data storage devices.

In response to the primary and secondary data storage devices receiving responses from each other, the responses indicating that the write operation has been successfully reconciled thereacross, it may be concluded that the data in each of the data storage devices has been successfully reconciled. Accordingly, additional steps based on this information, e.g., such as sending a subsequent write command, advancing an I/O buffer, updating a logical-to-physical table, etc., may be performed as desired.

It follows that the various approaches described above with respect to method 500 are desirably able to reduce performance times by allowing the host to communicate with the primary and secondary data storage devices in parallel. For instance, various ones of the approaches described herein are able to achieve a reduction of overhead compared to conventional data replication systems. Similarly, the primary and secondary data storage devices are able to operate in parallel as well as perform synchronization procedures therebetween without relying on input from the host. This allows for the data storage devices to assume responsibility for ensuring that the data is propagated according to the intended data storage schemes. This reduces network traffic and data retention is also improved as a result of actively ensuring that data is mirrored across multiple data storage devices. Accordingly, it is preferred that the various processes included in these approaches are applied to all write operations (e.g., all application writes) received from the host.

As noted above, failures may occur during the process of mirroring a write operation across the primary and secondary data storage devices, in which case various data recovery protocols may be implemented in an effort to repair communication channels between locations in the overarching distributed storage system, a central network, failed physical components and/or software implemented thereon, etc. Moreover, subsequent requests to perform write operations may be received before a current write operation has been successfully implemented. These write operation requests are preferably processed and staged such that metadata corresponding thereto is stored in memory and scheduled for implementation. Moreover, read operation requests which are received while a write operation is being performed are also preferably postponed and performed at a later point, e.g., as will soon become apparent.

Figure 5B:
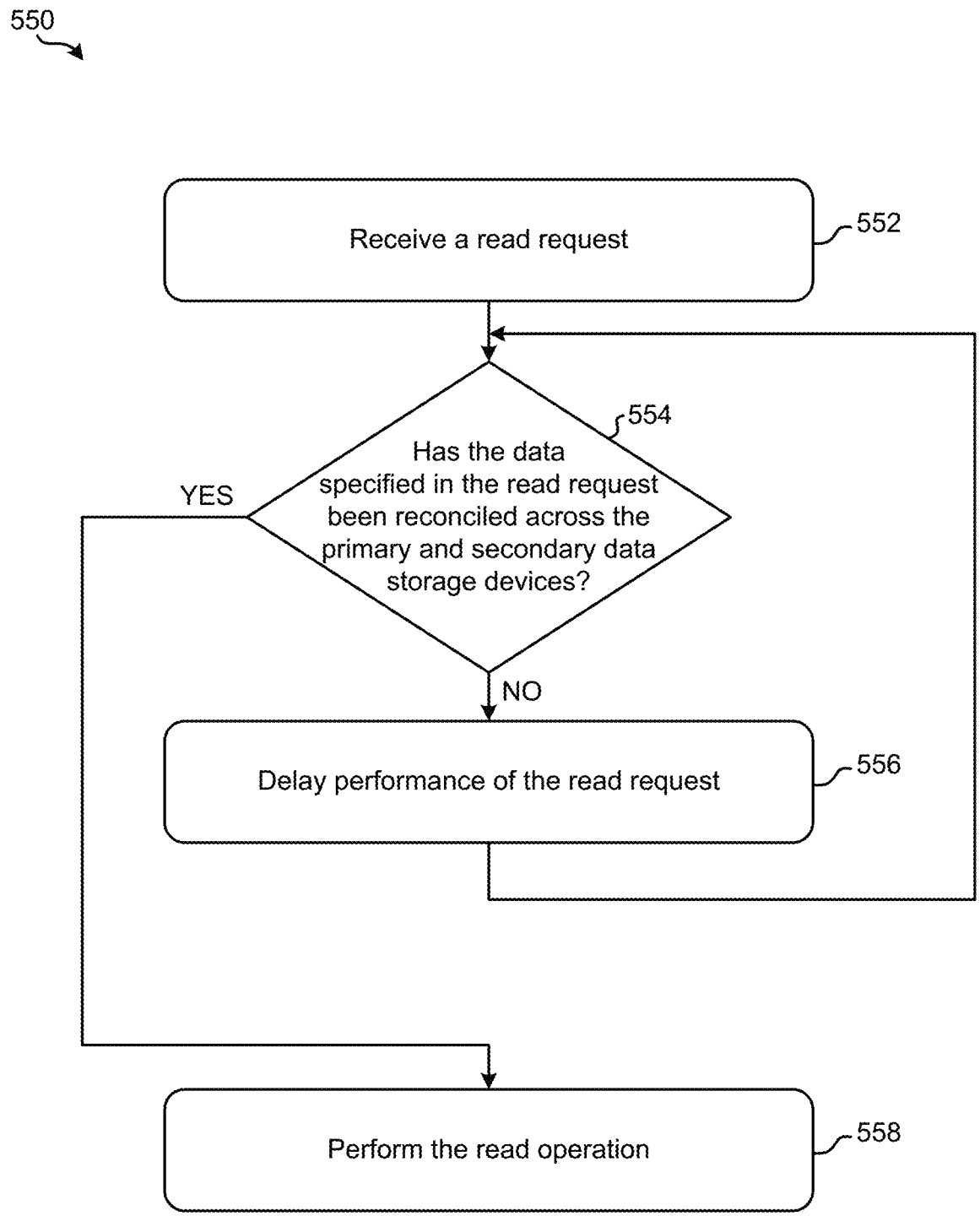
FIG. 5B is a flowchart of a method in accordance with one approach.

For instance, FIG. 5B illustrates a method 550 for evaluating a read request that has been received, in accordance with one approach. The method 550 is presented below in the context of the distributed data storage system referenced above in method 500 and thereby incorporates the various components illustrated in FIG. 4. However, any of the processes included in method 550 may be performed in accordance with the present invention in any of the environments depicted in FIGS. 1-5A, among others, in various approaches. Of course, more or less operations than those specifically described in FIG. 5B may be included in method 550, as would be understood by one of skill in the art upon reading the present descriptions.

Each of the steps of the method 550 may be performed by any suitable component of the operating environment. For example, in various approaches, the method 550 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 550. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 5B, operation 552 of method 550 includes actually receiving a read request. The read request may be received at the primary and/or secondary data storage devices depending on the given approach. For instance, the primary data storage device may serve as the active data storage device that is responsible for satisfying data inquiries such as read requests that are received during system operation. Moreover, a read request may be received from the host at any point in time. A request to read a particular grouping of data (e.g., file or record) may even be received before that data has been reconciled across the primary and secondary data storage devices.

Accordingly, decision 554 includes determining whether the data specified in the read request has been reconciled across the primary and secondary data storage devices. In other words, decision 554 involves determining whether the data specified in the read request has already been written to both primary and secondary data storage devices, and therefore whether the data has been reconciled from the storage device's perspective before allowing the read request to be satisfied. This determination is made in some approaches by inspecting a logical-to-physical table used to keep track of what data has already been reconciled across the primary and secondary data storage devices. The determination may also be made in other approaches by inspecting an I/O log which stores the write operation requests that are received at the storage device, actually inspecting memory (e.g., performing probe read operations), etc. It should also be noted that the mirroring relationship between the primary and secondary data storage devices is still in effect, thereby ensuring that the data in each of the data storage devices remains successfully reconciled.

In response to determining that the data specified in the read request has not been reconciled across the primary and secondary data storage devices, method 550 proceeds to operation 556 from decision 554. There, operation 556 includes delaying the read request. The read request is preferably delayed until the data specified in the read request has been reconciled between the primary and secondary data storage devices. Accordingly, the read request may be temporarily held in a buffer for a predetermined amount of time.

From operation 556, method 550 returns to decision 554 such that the determination may be repeated for the data corresponding to the read request. It follows that processes 554 and 556 may be repeated any number of times until it is determined that the data specified in the read request has been reconciled across the primary and secondary data storage devices. However, in some approaches a response indicating that the read request failed may be returned to the host in response to performing decision 554 a predetermined number of times, after a prespecified amount of time has passed, the requested data cannot be accessed (e.g., memory failure and/or data loss is identified), etc.

However, method 550 proceeds from decision 554 to operation 558 in response to determining that the data specified in the read request has been reconciled across the primary and secondary data storage devices. There, operation 558 includes actually performing the read operation by accessing the requested data from memory, and providing (e.g., returning) the requested data to the host. As noted above, one of the primary and secondary data storage devices serves as the "active" device which is used to perform read requests that are received, while the other one of the data storage devices serves as a "redundant" device. Accordingly, the processes in method 550 may be performed by an active one of the data storage devices. However, when the active one of the data storage devices goes offline, e.g., in response to experiencing a failure event, the redundant device may assume operational responsibility and at least temporarily become the active device for the time being. Similarly, any permanent errors experienced on the active device are preferably redirected to the redundant device for implementation.

It follows that the processes in method 550 allow for operational efficiency of the overarching system by essentially eliminating situations where a read operation is attempted, only to find that the data intended to be read is not yet stored in memory, has not yet been updated according to a modify write operation, etc. Moreover, method 550 may be implemented in conjunction with those in method 500 without causing any disruption to performance. This is particularly desirable as the delay reductions and data retention achieved by the approaches described above with respect to method 500 are combined with the improvements to read performance achieved by the approaches described with respect to method 550.

Again, various ones of the approaches included herein are desirably able to reduce performance times by allowing the host to communicate with the multiple data storage devices in parallel. Similarly, the data storage devices are able to operate in parallel as well as perform data synchronization procedures therebetween without relying on input from the host. This allows for the control units in each of the data storage devices to assume responsibility for ensuring that the data is propagated according to the intended data storage schemes. Moreover, the control units are able to communicate asynchronously as I/O requests are implemented. This reduces network traffic and data retention is also improved as a result of actively ensuring that data is mirrored across multiple data storage devices. Accordingly, it is preferred that the various processes included in these approaches are applied to all write operations (e.g., all application writes) received from the host.

It should also be noted that the various approaches included herein are in no way intended to limit the invention. For instance, although many of the approaches are described above in the context of a distributed data storage system having a host and two data storage devices, any number of data storage devices may be implemented. For example, a third copy of certain data (e.g., data deemed as being particularly "important") may be maintained in a third data storage device which is connected to the same network as the other storage devices. Similarly, although the various processes described above are performed for each I/O request received, any number of I/O requests may be aggregated and processed together.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for mirroring write operations across primary and secondary data storage devices, comprising:

receiving a first request to perform a write operation from a host;

performing the write operation;

sending metadata corresponding to the first request to the secondary data storage device;

receiving metadata corresponding to a second request to perform the write operation from the secondary data storage device, wherein the second request was received at the secondary data storage device from the host;

using the metadata corresponding to the first and second requests to determine whether the write operation has been mirrored across the primary and secondary data storage devices; and in response to determining that the write operation has been mirrored across the primary and secondary data storage devices, sending a response to the secondary data storage device which indicates that the write operation has been reconciled across the primary and secondary data storage devices.

2. The computer-implemented method of claim 1, comprising:

receiving a response from the secondary data storage device which indicates that the write operation has been reconciled across the primary and secondary data storage devices in response to the secondary data storage device determining that the write operation has been mirrored across the primary and secondary data storage devices, wherein the secondary data storage device performs the write operation in response to receiving the second request to perform the write operation, wherein the secondary data storage device uses the metadata corresponding to the first and second requests to determine whether the write operation has been reconciled across the primary and secondary data storage devices.

3. The computer-implemented method of claim 1, comprising:

receiving a read request;

determining whether data specified in the read request has been reconciled across the primary and secondary data storage devices;

in response to determining that the data specified in the read request has not been reconciled across the primary and secondary data storage devices, delaying performance of the read request; and in response to determining that the data specified in the read request has been reconciled across the primary and secondary data storage devices, performing the read request.

4. The computer-implemented method of claim 1, comprising:

sending a response to the host which indicates that the write operation has been performed prior to determining whether the write operation has been reconciled across the primary and secondary data storage devices.

5. The computer-implemented method of claim 1, wherein the metadata corresponding to the first request includes information selected from the group consisting of: a timestamp, hash values, and storage location identification, wherein the metadata corresponding to the second request includes information selected from the group consisting of: a timestamp, hash values, and storage location identification.

6. The computer-implemented method of claim 1, comprising:

storing the metadata corresponding to the first request in memory, wherein the metadata corresponding to the first request is overwritten by metadata corresponding to a subsequent request to perform a write operation on a same record as the first request.

7. The computer-implemented method of claim 1, wherein the using the metadata corresponding to the first and second requests to determine whether the write operation has been mirrored across the primary and secondary data storage devices is performed for all write operation requests received from the host.

8. A computer program product for mirroring write operations across primary and secondary data storage devices, the computer program product comprising a computer readable storage medium having program instructions embodied therewith, the program instructions readable and/or executable by a processor to cause the processor to:

receive, by the processor, a first request to perform a write operation from a host;

perform, by the processor, the write operation;

send, by the processor, metadata corresponding to the first request to the secondary data storage device;

receive, by the processor, metadata corresponding to a second request to perform the write operation from the secondary data storage device, wherein the second request was received at the secondary data storage device from the host;

use, by the processor, the metadata corresponding to the first and second requests to determine whether the write operation has been mirrored across the primary and secondary data storage devices; and in response to determining that the write operation has been mirrored across the primary and secondary data storage devices, send, by the processor, a response to the secondary data storage device which indicates that the write operation has been reconciled across the primary and secondary data storage devices.

9. The computer program product of claim 8, the program instructions readable and/or executable by the processor to cause the processor to:

receive, by the processor, a response from the secondary data storage device which indicates that the write operation has been reconciled across the primary and secondary data storage devices in response to the secondary data storage device determining that the write operation has been mirrored across the primary and secondary data storage devices, wherein the secondary data storage device performs the write operation in response to receiving the second request to perform the write operation, wherein the secondary data storage device uses the metadata corresponding to the first and second requests to determine whether the write operation has been mirrored across the primary and secondary data storage devices.

10. The computer program product of claim 8, the program instructions readable and/or executable by the processor to cause the processor to:

receive, by the processor, a read request;

determine, by the processor, whether data specified in the read request has been reconciled across the primary and secondary data storage devices;

in response to determining that the data specified in the read request has not been reconciled across the primary and secondary data storage devices, delay, by the processor, performance of the read request; and in response to determining that the data specified in the read request has been reconciled across the primary and secondary data storage devices, perform, by the processor, the read request.

11. The computer program product of claim 8, the program instructions readable and/or executable by the processor to cause the processor to:

send, by the processor, a response to the host which indicates that the write operation has been performed prior to determining whether the write operation has been mirrored across the primary and secondary data storage devices.

12. The computer program product of claim 8, wherein the metadata corresponding to the first request includes information selected from the group consisting of: a timestamp, hash values, and storage location identification, wherein the metadata corresponding to the second request includes information selected from the group consisting of: a timestamp, hash values, and storage location identification.

13. The computer program product of claim 8, the program instructions readable and/or executable by the processor to cause the processor to:

store, by the processor, the metadata corresponding to the first request in memory, wherein the metadata corresponding to the first request is overwritten by metadata corresponding to a subsequent request to perform a write operation on a same record as the first request.

14. The computer program product of claim 8, wherein the using the metadata corresponding to the first and second requests to determine whether the write operation has been mirrored across the primary and secondary data storage devices is performed for all write operation requests received from the host.

15. A primary data storage device, comprising:

a processor; and logic integrated with the processor, executable by the processor, or integrated with and executable by the processor, the logic being configured to:

receive, by the processor, a first request to perform a write operation from a host;

perform, by the processor, the write operation;

send, by the processor, metadata corresponding to the first request to a secondary data storage device;

receive, by the processor, metadata corresponding to a second request to perform the write operation from the secondary data storage device, wherein the second request was received at the secondary data storage device from the host;

use, by the processor, the metadata corresponding to the first and second requests to determine whether the write operation has been mirrored across the primary and secondary data storage devices; and in response to determining that the write operation has been mirrored across the primary and secondary data storage devices, send, by the processor, a response to the secondary data storage device which indicates that the write operation has been reconciled across the primary and secondary data storage devices.

16. The primary data storage device of claim 15, the logic being configured to:

receive, by the processor, a response from the secondary data storage device which indicates that the write operation has been reconciled across the primary and secondary data storage devices in response to determining that the write operation has been mirrored across the primary and secondary data storage devices, wherein the secondary data storage device performs the write operation in response to receiving the second request to perform the write operation, wherein the secondary data storage device uses the metadata corresponding to the first and second requests to determine whether the write operation has been mirrored across the primary and secondary data storage devices.

17. The primary data storage device of claim 15, the logic being configured to:

receive, by the processor, a read request;

determine, by the processor, whether data specified in the read request has been reconciled across the primary and secondary data storage devices;

in response to determining that the data specified in the read request has not been reconciled across the primary and secondary data storage devices, delay, by the processor, performance of the read request; and in response to determining that the data specified in the read request has been reconciled across the primary and secondary data storage devices, perform, by the processor, the read request.

18. The primary data storage device of claim 15, the logic being configured to:

send, by the processor, a response to the host which indicates that the write operation has been performed prior to determining whether the write operation has been mirrored across the primary and secondary data storage devices.

19. The primary data storage device of claim 15, wherein the metadata corresponding to the first request includes information selected from the group consisting of: a timestamp, hash values, and storage location identification, wherein the metadata corresponding to the second request includes information selected from the group consisting of: a timestamp, hash values, and storage location identification.

20. The primary data storage device of claim 15, the logic being configured to:

store, by the processor, the metadata corresponding to the first request in memory, wherein the metadata corresponding to the first request is overwritten by metadata corresponding to a subsequent request to perform a write operation on a same record as the first request.

21. The primary data storage device of claim 15, wherein the using the metadata corresponding to the first and second requests to determine whether the write operation has been mirrored across the primary and secondary data storage devices is performed for all write operation requests received from the host.

22. A computer-implemented method for mirroring write operations across primary and secondary data storage devices, comprising:

receiving a first request to perform a write operation from a host;

performing the write operation;

sending metadata corresponding to the first request to the primary data storage device;

receiving metadata corresponding to a second request to perform the write operation from the primary data storage device, wherein the second request was received at the primary data storage device from the host;

using the metadata corresponding to the first and second requests to determine whether the write operation has been mirrored across the primary and secondary data storage devices; and in response to determining that the write operation has been mirrored across the primary and secondary data storage devices, sending a response to the primary data storage device which indicates that the write operation has been reconciled across the primary and secondary data storage devices.

23. The computer-implemented method of claim 22, comprising:

receiving a response from the primary data storage device which indicates that the write operation has been reconciled across the primary and secondary data storage devices in response to determining that the write operation has been mirrored across the primary and secondary data storage devices, wherein the primary data storage device performs the write operation in response to receiving the second request to perform the write operation, wherein the primary data storage device uses the metadata corresponding to the first and second requests to determine whether the write operation has been mirrored across the primary and secondary data storage devices.

24. The computer-implemented method of claim 22, comprising:

receiving a read request;

determining whether data specified in the read request has been reconciled across the primary and secondary data storage devices;

in response to determining that the data specified in the read request has not been reconciled across the primary and secondary data storage devices, delaying performance of the read request until the data specified in the read request has been reconciled across the primary and secondary data storage devices; and in response to determining that the data specified in the read request has been reconciled across the primary and secondary data storage devices, performing the read request.

25. A computer-implemented method for mirroring write operations across primary and secondary data storage devices, comprising:

sending a first request to perform a write operation to a primary data storage device;

sending a second request to perform the write operation to a secondary data storage device;

receiving a first response from the primary data storage device which indicates that the write operation has been performed; and receiving a first response from the secondary data storage device which indicates that the write operation has been performed, wherein metadata corresponding to the first request to perform the write operation is sent from the primary data storage device to the secondary data storage device, wherein metadata corresponding to the second request to perform the write operation is sent from the secondary data storage device to the primary data storage device, wherein the primary and secondary data storage devices each use the metadata corresponding to the first and second requests to determine whether the write operation has been mirrored across the primary and secondary data storage devices.

* * * * *